(12) United States Patent
Romem et al.

(10) Patent No.: US 10,810,082 B2
(45) Date of Patent: Oct. 20, 2020

(54) NETWORKED STORAGE REDUNDANCY SCHEME

(71) Applicant: Excelero Storage Ltd., Tel Aviv (IL)

(72) Inventors: Yaniv Romem, Jerusalem (IL); Ofer Oshri, Kfar Saba (IL); Omri Mann, Jerusalem (IL); Kirill Shoikhet, Tel Aviv (IL); Daniel Herman Shmulyan, Beer Yaaqov (IL); James Jackson, Colorado Springs, CO (US)

(73) Assignee: Excelero Storage Ltd., Tel Aviv (IL)

( * ) Notice: Subject to any disclaimer, the term of this patent is extended or adjusted under 35 U.S.C. 154(b) by 25 days.

(21) Appl. No.: 16/227,869

(22) Filed: Dec. 20, 2018

(65) Prior Publication Data

US 2019/0196900 A1 Jun. 27, 2019

Related U.S. Application Data

(60) Provisional application No. 62/610,218, filed on Dec. 24, 2017.

(51) Int. Cl.
*G06F 11/10* (2006.01)
*G06F 12/10* (2016.01)

(52) U.S. Cl.
CPC ...... *G06F 11/1076* (2013.01); *G06F 11/1004* (2013.01); *G06F 12/10* (2013.01); *G06F 2212/1044* (2013.01)

(58) Field of Classification Search
CPC ............. G06F 11/1004; G06F 11/1076; G06F 11/1096; G06F 3/0619; G06F 3/061; G06F 12/10; G06F 12/102; G06F 11/2094; G06F 2201/82; G06F 3/0689
See application file for complete search history.

(56) References Cited

U.S. PATENT DOCUMENTS

| 8,176,245 B2 | 5/2012 | Huang et al. |
| 8,862,856 B2 | 10/2014 | Hall |
| 2015/0046670 A1* | 2/2015 | Kim ..................... G06F 11/1471 711/207 |
| 2017/0123921 A1* | 5/2017 | Ptak .................... G06F 11/1096 |

OTHER PUBLICATIONS

Dong et al., HS_RAID:optimizing small write performance in HS_RAID, 2016, Hindawi publishing corportion, Journal of Electrical and Computer Engineering, (retrived from Google on Mar. 9, 2020) pp. 1 to 8.*

* cited by examiner

*Primary Examiner* — Shelly A Chase
(74) *Attorney, Agent, or Firm* — M&B IP Analysts, LLC

(57) ABSTRACT

A system and method for improved redundancy in storage devices are disclosed. The method includes receiving a first data block for writing to a storage device; writing the first block to a journal connected with the storage device; associating a first logical address of a group of logical addresses of the journal with a first physical address of the storage; associating the first physical address to an additional second logical address of the storage device, the second logical address not of the group of logical addresses of the journal; and disassociating the first physical address from the first logical address, in response to associating the first physical address with the additional second logical address.

11 Claims, 7 Drawing Sheets

NETWORKED STORAGE REDUNDANCY SCHEME

CROSS-REFERENCE TO RELATED APPLICATIONS

This application claims the benefit of U.S. Provisional Application No. 62/610,218 filed on Dec. 24, 2017, the contents of which are hereby incorporated by reference.

TECHNICAL FIELD

The disclosure generally relates to network storage and particularly to improved techniques in redundant network storage schemes.

BACKGROUND

Network storage allows for many applications. In order to increase reliability, redundancies are built in to such systems, such as RAID (redundant array of inexpensive disks), which requires multiple disk writes to write the data and the redundancy. If all of those writes complete, then a redundancy calculation on the data results in the contents of the redundancy blocks. This is called a consistent stripe. However, the multiple writes are not an atomic operation. If some of the writes are finished and some are not, then the stripe is inconsistent.

The inconsistency due to the interrupted non-atomic multi-disk write operation is called a write hole. Inconsistent redundancy may exist for a very long time, until it is needed for error recovery (e.g., a block read failure or a disk failure). It can corrupt not only the data that was written, but also unrelated data on the same stripe.

It would therefore be advantageous to detect and recover from write holes.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments herein include a computerized method for improved redundancy in storage devices. The method includes receiving a first data block for writing to a storage device; writing the first block to a journal connected with the storage device; associating a first logical address of a group of logical addresses of the journal with a first physical address of the storage; associating the first physical address to an additional second logical address of the storage device, the second logical address not of the group of logical addresses of the journal; and disassociating the first physical address from the first logical address, in response to associating the first physical address with the additional second logical address.

Certain embodiments herein also include a computing system for improving redundancy in storage devices. The computing system includes a memory; and a processing circuitry coupled to the memory, wherein the processor is configured to execute instructions stored on the memory to: receive a first data block for writing to a storage device; write the first block to a journal connected with the storage device; associate a first logical address of a group of logical addresses of the journal, with a first physical address of the storage; associate the first physical address to an additional second logical address of the storage device, the second logical address not of the group of logical addresses of the journal; and disassociate the first physical address from the first logical address, in response to associating the first physical address with the additional second logical address.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

Figure 1:
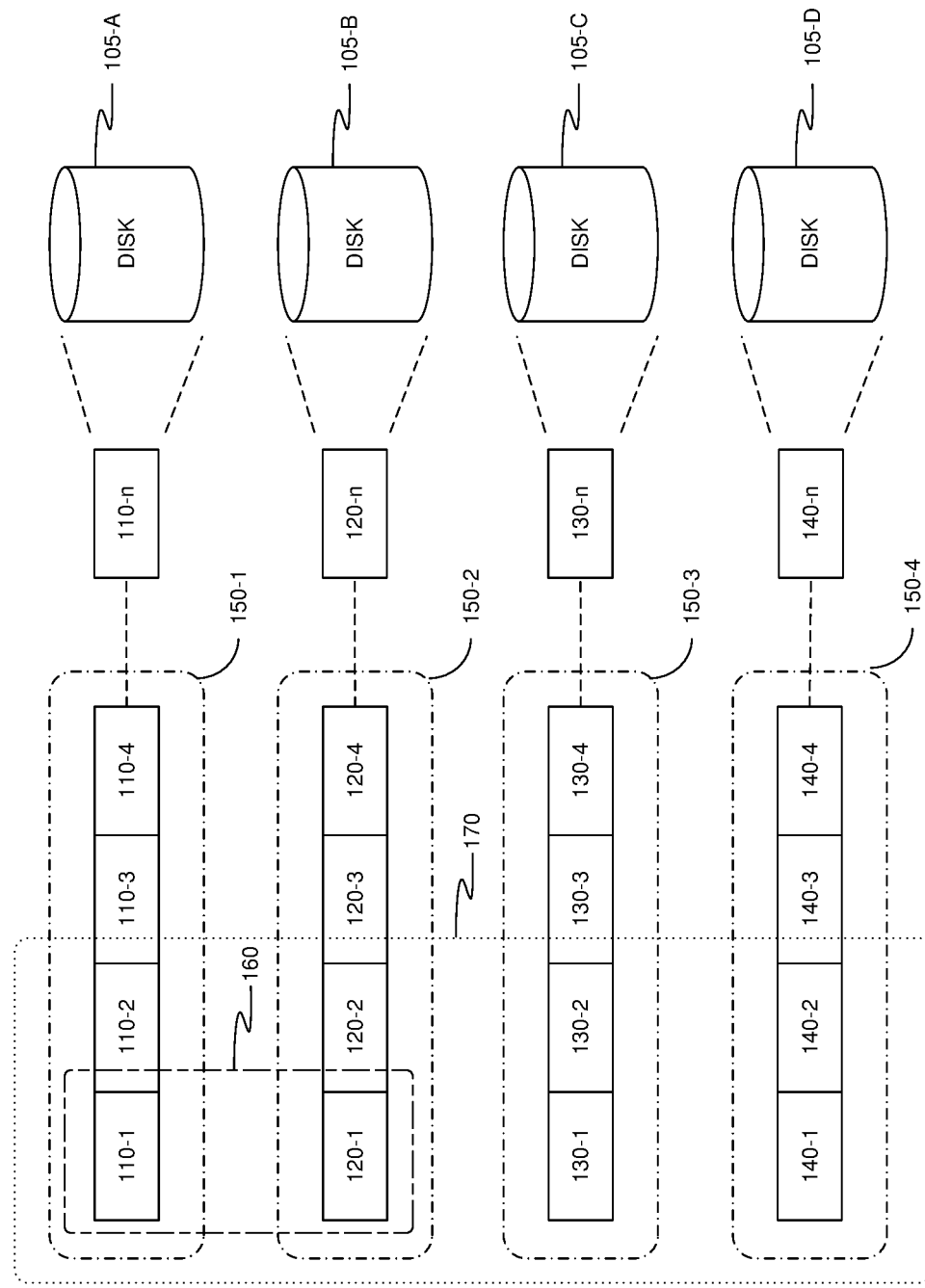
FIG. 1 is a schematic illustration of a data layout in a redundant storage array, implemented in accordance with an embodiment.

It is important to note that the embodiments disclosed by the invention are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

When writing information to a redundant storage, typically data blocks need to be written to more than one storage disk. The write operations are dependent on each other and must be completed together. When this is successful the storage is called consistent. The inconsistency due to interrupted non-atomic multi-disk write operations is called a write hole. To solve this, when a first data block for writing is received, the first block is written to a journal of the storage device.

Writing to the journal includes associating a first logical address of a group of logical addresses of the journal, with a first physical address of the storage. The first physical address is associated with an additional second logical address of the storage device. The first physical address is then disassociated from the first logical address, in response to associating the first physical address with the additional second logical address.

FIG. 1 is an example schematic illustration of a data layout in a redundant storage array, implemented in accordance with an embodiment. A plurality of storage devices (also referred to as storages, disks, etc.) 105-A through 105-D together form a redundant configuration for storing information thereon. Such redundancies are well known in the art, one of the more well-known being RAID—redundant array of inexpensive disks. Redundancy may be achieved in many ways, each having their own advantages and disadvantages.

Typically, schemes may include striping, mirroring, and parity. Striping data ensures logically sequential data is stored on different storages. Mirroring data is the act of storing the same data (e.g. block of data) on multiple physical storages. Parity is generated from two or more data blocks, for example by instructing a processor to perform a calculation thereon. Performing a XOR function between a first block and second block can, in certain embodiments, result in a parity block.

In such an embodiment, the first block is stored on a first storage, the second block on a second storage, and the parity block is stored on a parity storage. If, for example, the second storage is corrupted, the second block may be reconstructed, for example by performing a XOR function between the first block and the parity block. In this exemplary embodiment, each storage device 105 includes a plurality of data blocks. For example, storage device 105-A includes data blocks 110-1 through 110-n, where 'n' is an integer number having a value of '2' or greater.

Disk segment 150-1 includes blocks 110-1 through 110-4. Disk segment 150-2 is a mirror of disk segment 150-1, including blocks 120-1 through 120-4 which correspond to blocks 110-1 through 110-4. A slice 160 includes a pair of corresponding blocks on different physical storages, in this case block 110-1 and corresponding block 120-1.

All data blocks for any given slice need to have the same data stored thereon to be considered consistent, therefore any write or erase operation should be atomic. Stripe 170 includes a plurality of blocks, such that the data on block 110-1 is consecutive to the data on block 130-1. Block 130-1 is in turn mirrored by block 140-1. A parity block may be utilized such that parity block 120-n is generated from blocks 110-1 and 130-1. Parity block 130-n may be generated from blocks 120-1 and 140-1, for example. This redundancy data scheme therefore includes striping, mirroring, and parity.

Figure 2:
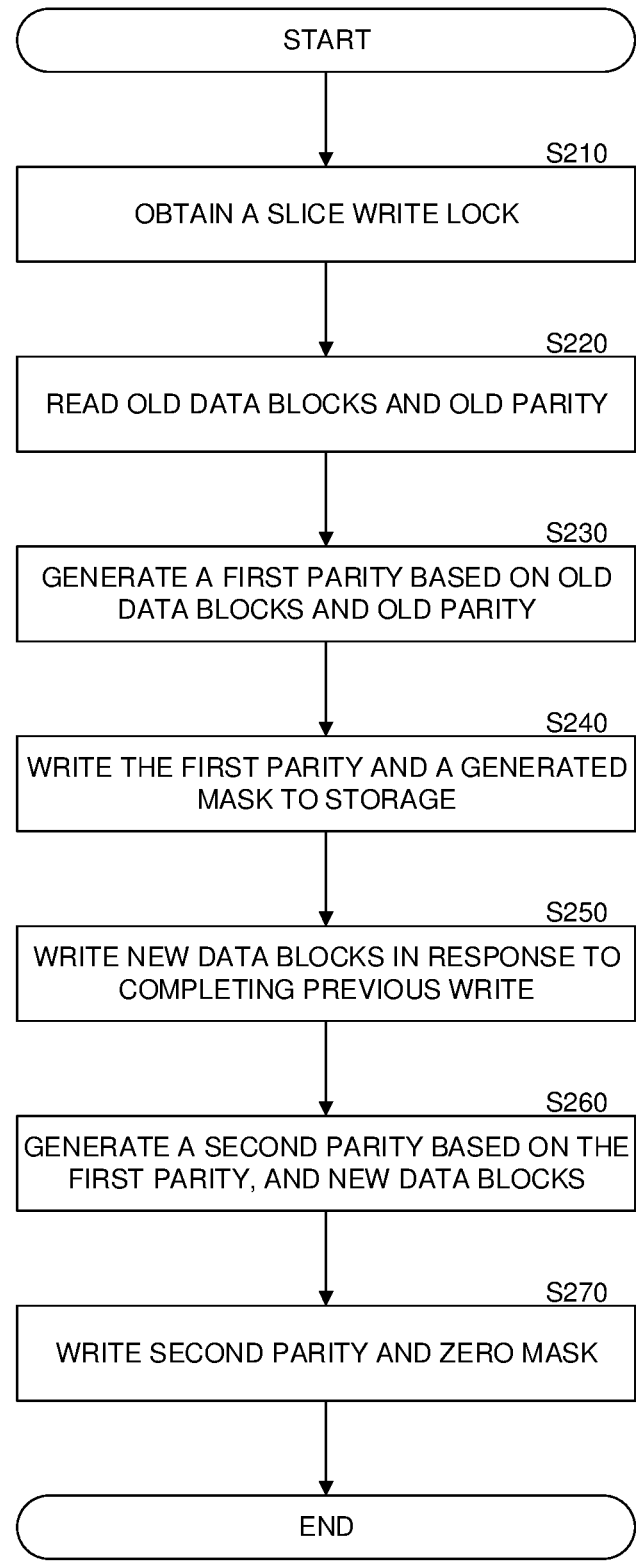
FIG. 2 is a flowchart of a computerized method for an improved storage redundancy stream, implemented in accordance with an embodiment.

FIG. 2 is an example flowchart 200 of a method for an improved storage redundancy stream, implemented in accordance with an embodiment.

At S210 a write lock is obtained for a slice. The slice includes one or more blocks, such that at least a first block is of a first physical storage (e.g. storage device 105-A) and at least a second block is of a second physical storage (e.g. storage device 105-B). In order for the slice to be consistent writing must be done atomically. This means that a write can be executed only once the lock for all blocks in the slice is obtained.

At S220 one or more old data blocks are read from the slice, and a corresponding old parity block is read as well. An old data block is a data block which is about to be overwritten with a new data block. One or more old data blocks may be rewritten with one or more corresponding new data blocks. The slice may contain therein a first group of data blocks from a first storage device, a second group of corresponding data blocks from a second storage device, etc. In some embodiments, a parity block which corresponds to the blocks in the slice is also read.

At S230 a first parity block is generated based on one or more old data blocks and a corresponding old parity block. Metadata may be further generated, to indicate which blocks are rewritten, and which blocks remain unmodified. For example, the metadata may be stored as a mask of bits, such that each bit corresponds to a block, indicating whether a block is rewritten (modified) or not. In some embodiments, the metadata may be appended to each block.

At S240 the first parity block and the corresponding metadata are written to a storage device. In some embodiments, the parity blocks may be stored on a storage device dedicated to storing parity blocks. After the first parity block and the metadata are written to the storage device, any old data blocks are expendable.

At S250 in response to completion of writing the first parity block and the corresponding metadata, the one or more new data blocks are written to storage.

At S260, a second parity block is generated based on the first parity, and the one or more new data blocks. In some embodiments, a parity block may be generated for example by performing a XOR function between a first block and at least a second block.

At S270 the second parity block is written. The metadata may be reinitialized, for example, if a mask is use all bits may be set to zero. The second parity block is written in response to completion of writing the one or more new data blocks.

Figure 3:
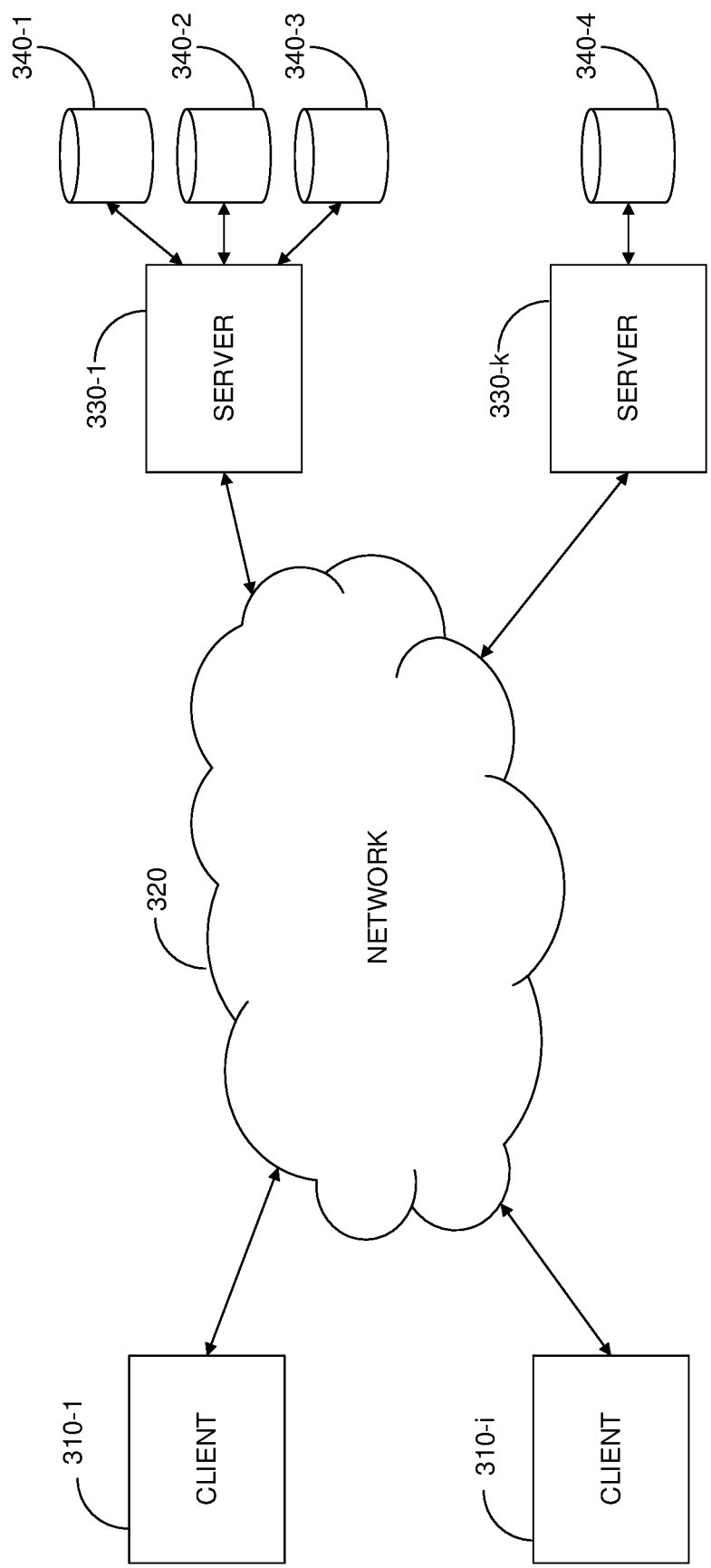
FIG. 3 is a schematic illustration of a redundancy scheme providing storage services to a plurality of client devices, implemented in accordance with an embodiment.

FIG. 3 is an example schematic illustration of a redundancy scheme providing storage services to a plurality of client devices, implemented in accordance with an embodiment. A plurality of client devices 310-1 through 310-i are communicatively coupled with a network 320.

A client device may be a computing device, such as a server, personal computer, tablet, and the like. In an embodiment, the network 320 may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity.

The network 320 may further provide remote direct memory access (RDMA) services, for example to servers 330-1 through 330-k. In this exemplary embodiment, 'i' and 'k' are integers each having a value of '1' or greater. In this exemplary embodiment, the redundancy scheme is such that storage devices 340-1 and 340-2, which are coupled to server 330-1, are mirrored storages. Storage 340-3 is coupled to server 330-1 and data striping is performed between it and storage device 340-1. Storage device 340-4 which is coupled to server 330-k is a parity storage device.

Figure 4:
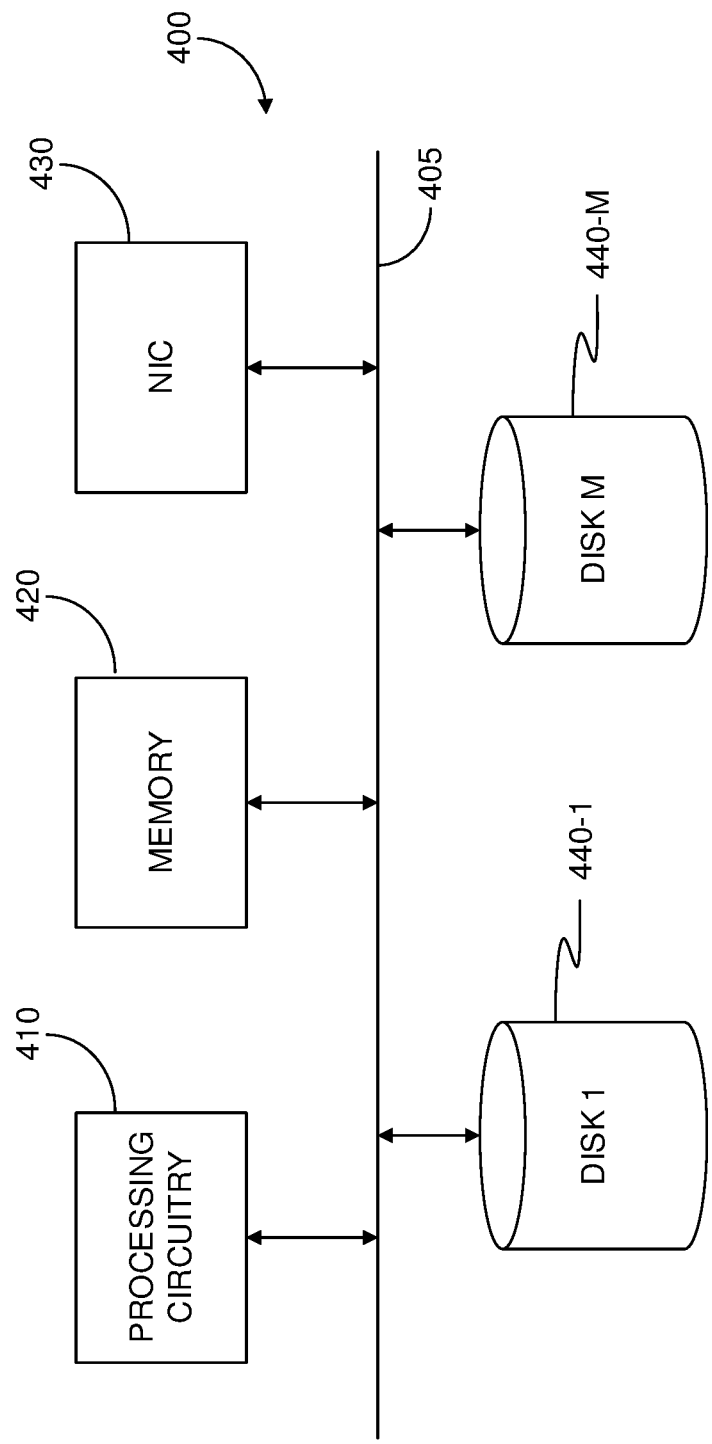
FIG. 4 is a schematic illustration of a server offering redundant storage capabilities, implemented according to an embodiment.

FIG. 4 is an example schematic illustration of a server 400 offering redundant storage capabilities, implemented according to an embodiment. The server 400 includes at least one processing circuitry 410, for example, a central processing unit (CPU). In an embodiment, the processing circuitry 410 may be a component of, a larger processing unit implemented with one or more processors.

The processing circuitry 410 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 410 is connected via a bus 405 to a memory 420.

The memory 420 may include a memory portion that contains instructions that when executed by the processing circuitry 410 performs the method described in more detail herein. The memory 420 may be further used as a working scratch pad for the processing circuitry 410, a temporary storage, and others, as the case may be.

The memory 420 may be a volatile memory such as, but not limited to random access memory (RAM), or nonvolatile memory (NVM), such as, but not limited to, Flash memory. The processing circuitry 410 may be coupled to a network interface controller (NIC) 430. The NIC 430 may connect to a network, such as network 320.

In some embodiments, the NIC 430 may be configured to utilize RDMA operations. The processing circuitry 410 may be further connected with a plurality of storages such as storage disks 440-1 through 440-M (M is an integer greater than 1). The storage disks may be used in various redundancy schemes, implementing striping, mirroring, and parity generation.

The processing circuitry 410 and/or the memory 420 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 5:
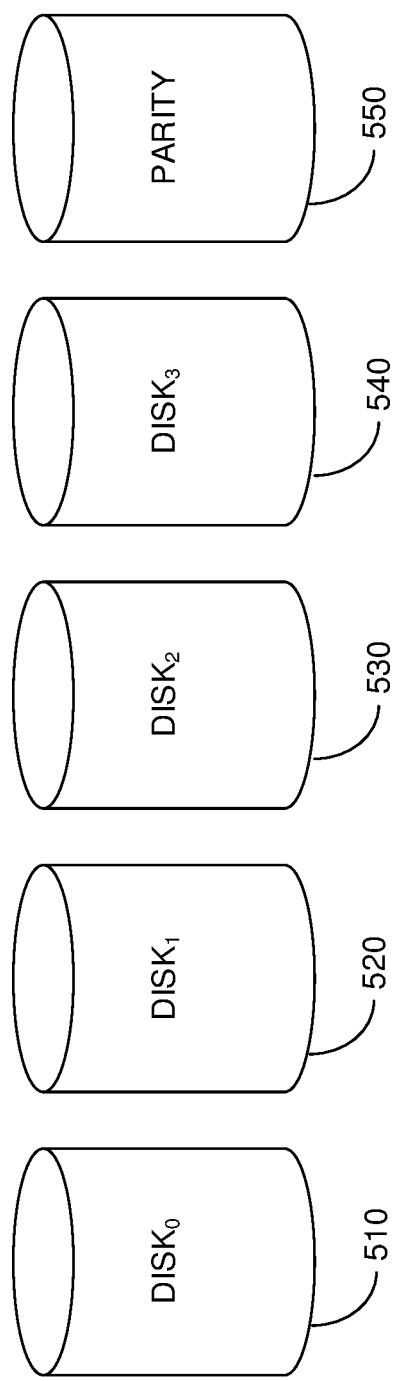
FIG. 5 is a schematic illustration of a redundant array of storage devices with an improved redundancy scheme, implemented in accordance with an embodiment.

FIG. 5 is an example schematic illustration of a redundant array of storage devices with an improved redundancy scheme, implemented in accordance with an embodiment. In this exemplary embodiment, a first new data block is written to Disk-1 520 and a second new data block is written to Disk-2 530. A lock is obtained for Disk-1 520 and Disk-2 530. An old parity block, which corresponds to a first old data block from Disk-1 520 and a second old data block from Disk-2 530, is read from a parity storage 550.

A temporary parity block is generated from the old parity block, the first old data block, and the second old data block. Metadata which indicates which data blocks were changed may also be generated. As stated in the examples above, the metadata may be a mask, in this example, the mask may be '1001', indicating the Disk-0 510 and Disk-3 540 are covered by parity, while Disk-1 520 and Disk-2 530 are not. The temporary parity block and corresponding metadata are stored, for example in parity storage 550.

Upon completion of writing the temporary parity, the first old data block and the second old data block are disposable, as they are no longer covered by the parity redundancy. The first new data block and the second new data block are written to their respective storage devices, in response to completion of writing the temporary parity to storage. A new parity block is generated from the first new data block, the second new data block, and the temporary parity. The new parity may be stored on the parity storage 550.

The metadata may be initialized, to indicate that all blocks are covered by the new parity block. Upon completion of writing the new parity block to the parity storage 550, the first new data block may be written to Disk-1 520, and the second new data block may be written to Disk-2 530. Upon completion of writing the new data blocks, the lock may be released. This method may be used to detect and recover write holes, which occur when a stripe is inconsistent (i.e. some writes are finished and some are not).

The method presented here requires additional network round-trips and one or more additional disk writes over a naive RAID approach that does not handle write holes. If the block length is increased solely due to containing the mask, more media space is consumed per block and fewer blocks are available. However, the method is less costly in terms of storage space than a cache-everything approach, and also allows for a per block error detection code (e.g., CRC64), so that data corruption can be detected end-to-end. An error in writing can occur and be recovered thus. Upon detection of, for example, an error in communication between a client and a server, a check can be performed to determine the state of the metadata. If a portion of the metadata is set to a non-zero indicating value, nothing needs to be done, other than clearing the metadata.

The slice is consistent with either the old data, or new data. If all metadata is set to non-zero values, this may be due to only a portion of the writes being complete. In such a case, the slice is inconsistent. The server may read the metadata, the old parity and the new parity to determine which blocks are old and which are new, then use the old parity and new parity blocks to complete the write operations where new blocks need to be written. The metadata is then initialized, in response to completion of the writes.

Figure 6:
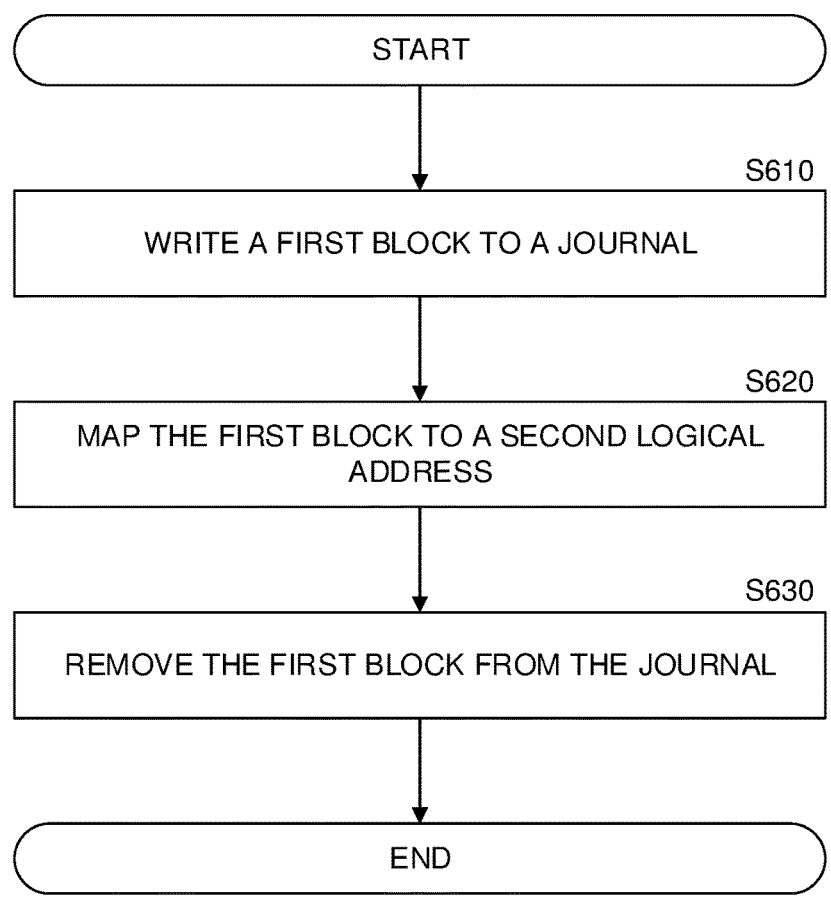
FIG. 6 is a flowchart of a method for utilizing a redundant array of disks including a write journal for avoiding write holes, implemented in accordance with an embodiment.

FIG. 6 is an example flowchart 600 illustrating the operation of a computerized method for utilizing a redundant array of disks including a write journal for avoiding write holes, implemented in accordance with an embodiment.

At S610 a first data block is written to a first physical address of a storage device, the first physical address associated with a first logical address of a journal. The storage device includes a plurality of physical addresses, each corresponding to a logical block address. For example, in Flash technology based solid disk drives (SSDs) a Flash Translation Layer (FTL) translates logical blocks, which are referenced by devices or components accessing the storage, to physical blocks on the storage drive.

A journal includes a first group of logical addresses, and may have a size varying according to the disk type, for example. The storage device includes a first group of logical addresses associated with a journal, and a second group of logical addresses, which are not associated with the journal.

At S620 the storage device maps the first data block to a second logical address of the second group of logical addresses. In this step, the second logical address and the first logical address both point to the first physical block address.

At S630 the storage device removes the map of the first logical address, in response to determining that the second logical address is associated with the first physical address.

Some prior art solutions suggest to perform a write to the journal, then write the data block to the second address, and finally erase from the journal. This solution requires multiple writes, which may result for example in a faster degradation of the drive. Other prior art solutions suggest to write the data block to a journal, then rewrite the logical block addresses, to remove the address from the journal and add it to the addresses actually used by the storage, and possibly remove another address from the storage and associate it with the journal, to ensure the size of the journal does not diminish with every write operation. However this method may introduce computational overhead which may not be desired.

Figure 7:
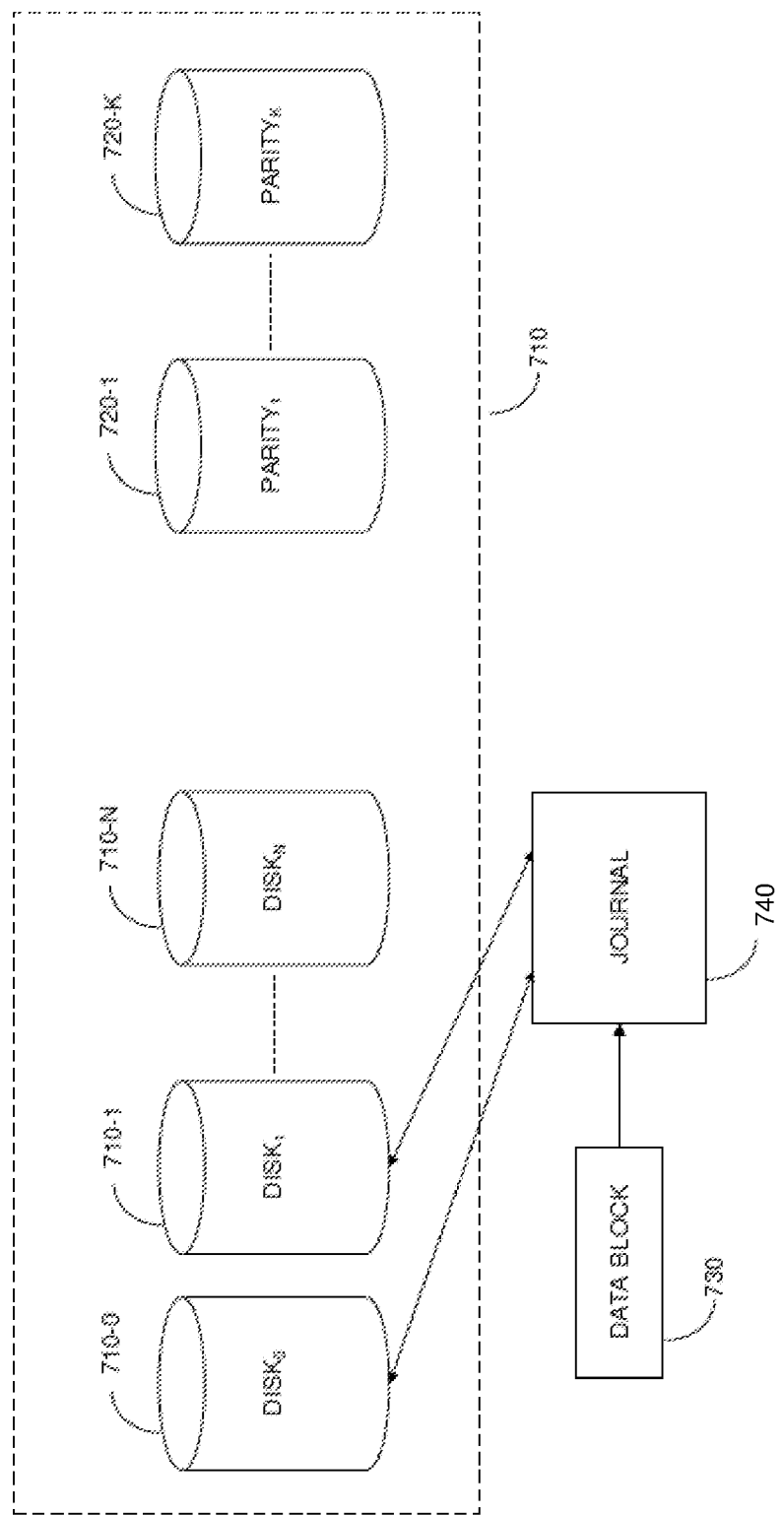
FIG. 7 is a schematic illustration of a storage redundancy scheme utilizing a journal to avoid write holes, implemented in accordance with an embodiment.

FIG. 7 is an example schematic illustration of a storage redundancy scheme utilizing a journal to avoid write holes, implemented in accordance with an embodiment. A redundant array of storage devices 710 includes a first group of storage disks 710-0 through 710-N, and a second group of parity disks 720-1 through 720-K, where 'N' and 'K' are integer numbers, which are defined according to the specification and required redundancy scheme. Typically, 'N' should have a value larger than 'K', where N and K are integer numbers. A redundancy scheme may be for example RAID5, RAID6, etc.

In this exemplary embodiment, a data block 730 is to be written to a first disk 710-0 and a second disk 710-1. A parity disk 720 should most likely be updated as well in response to the data block 730 being written, as this changes the content of the disks. In order to avoid the write hole problem described above, the data block 730 is written to a journal 740. The journal 740 may be on an independent disk, one of the disks 710-0 through 710-N, a journal may be present on each individual storage, or a combination of these methods may be utilized.

As detailed in the method above, the data block is written to the journal. A first logical address of the first disk 710-0 is associated with the physical address of the data block, and a second logical address of the second disk 710-1 is associated with the same physical address of the data block. The logical address of the journal is then released.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions.

Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for improved redundancy in storage devices, comprising:
    receiving a first data block for writing to a storage device;
    writing the first block to a journal connected with the storage device;
    associating a first logical address of a group of logical addresses of the journal with a first physical address of the storage;
    associating the first physical address to an additional second logical address of the storage device, the second logical address not of the group of logical addresses of the journal; and
    disassociating the first physical address from the first logical address, in response to associating the first physical address with the additional second logical address;
    wherein the storage device is one of a plurality of storage devices, comprising a first group of storage devices, and a second group of parity storage devices.

2. The computerized method of claim 1, wherein the journal includes at least one of: a group of logical addresses of the storage device and a group of logical addresses on at least one other storage devices.

3. The computerized method of claim 1, further comprising:
    updating at least one parity blocks in at least one parity storage devices, in response to writing the first block, so that the updated one or more parity blocks are based at least in part on the first block.

4. The computerized method of claim 3, wherein disassociating the first physical address from the first logical address is further in response to receiving a notification from a parity storage device of the second group, that the parity storage has been updated.

5. The computerized method of claim 1, wherein each storage device of the first group is communicatively coupled with a journal, such that the journal of a first storage device is physically on a second storage device.

6. A computer readable medium having stored thereon instructions for causing processing circuitry to execute a process for improved redundancy in storage devices, the process comprising:
    receiving a first data block for writing to a storage device;
    writing the first block to a journal communicatively coupled with the storage device;
    associating a first logical address of a group of logical addresses of the journal, with a first physical address of the storage;
    associating the first physical address to an additional second logical address of the storage device, the second logical address not of the group of logical addresses of the journal; and
    disassociating the first physical address from the first logical address, in response to associating the first physical address with the additional second logical address;
    wherein the storage device is one of a plurality of storage devices, comprising a first group of storage devices, and a second group of parity storage devices.

7. A computing system for improving redundancy in storage devices, comprising:
    a memory; and
    a processing circuitry coupled to the memory, wherein the processing circuitry is configured to execute instructions stored on the memory to:
    receive a first data block for writing to a storage device;
    write the first block to a journal connected with the storage device;

associate a first logical address of a group of logical addresses of the journal, with a first physical address of the storage;

associate the first physical address to an additional second logical address of the storage device, the second logical address not of the group of logical addresses of the journal; and disassociate the first physical address from the first logical address, in response to associating the first physical address with the additional second logical address;

wherein the storage device is one of a plurality of storage devices, comprising a first group of storage devices, and a second group of parity storage devices.

8. The computing system of claim 7, wherein the journal is comprised of any of: a group of logical addresses of the storage device, a group of logical addresses on one or more other storage devices, and any combination thereof.

9. The computing system of claim 7, wherein the processor is further configured to:

update at least one parity blocks in at least one parity storage devices, in response to writing the first block, so that the updated one or more parity blocks are based at least in part on the first block.

10. The computing system of claim 9, wherein disassociating the first physical address from the first logical address is further in response to receiving a notification from a parity storage device of the second group, that the parity storage has been updated.

11. The computing system of claim 7, wherein each storage device of the first group is connected with a journal, wherein the journal of a first storage device is physically on a second storage device.

* * * * *